US010222995B2

United States Patent
Jakkula et al.

(10) Patent No.: US 10,222,995 B2
(45) Date of Patent: Mar. 5, 2019

(54) SYSTEM AND METHOD FOR PROVIDING A ZERO CONTENTION PARALLEL DATA STACK

(71) Applicant: SAMSUNG ELECTRONICS CO., LTD., Suwon-si, Gyeonggi-do (KR)

(72) Inventors: Vijaya Kumar Jakkula, San Jose, CA (US); Venkata Bhanu Prakash Gollapudi, Santa Clara, CA (US)

(73) Assignee: Samsung Electronics Co., Ltd. (KR)

( * ) Notice: Subject to any disclaimer, the term of this patent is extended or adjusted under 35 U.S.C. 154(b) by 240 days.

(21) Appl. No.: 15/244,891

(22) Filed: Aug. 23, 2016

(65) Prior Publication Data

US 2017/0300229 A1   Oct. 19, 2017

Related U.S. Application Data

(60) Provisional application No. 62/322,127, filed on Apr. 13, 2016.

(51) Int. Cl.
*G06F 3/06* (2006.01)
(52) U.S. Cl.
CPC ............ *G06F 3/061* (2013.01); *G06F 3/0607* (2013.01); *G06F 3/0632* (2013.01); *G06F 3/0635* (2013.01); *G06F 3/0652* (2013.01); *G06F 3/0673* (2013.01)
(58) Field of Classification Search
None
See application file for complete search history.

(56) References Cited

U.S. PATENT DOCUMENTS

| 7,007,047 | B2 | 2/2006 | Zelenka et al. |
| 7,818,436 | B2 | 10/2010 | Gallant et al. |
| 8,190,818 | B2 | 5/2012 | Mimatsu |
| 8,332,374 | B2 | 12/2012 | Lev et al. |
| 8,719,806 | B2 | 5/2014 | Wang et al. |
| 8,954,986 | B2 * | 2/2015 | Rajagopalan ......... G06F 9/5066 700/4 |
| 9,032,164 | B2 * | 5/2015 | Rupanagunta ........ G06F 3/0613 711/154 |
| 9,069,473 | B2 | 6/2015 | Hetzler et al. |
| 2004/0025052 | A1 * | 2/2004 | Dickenson .............. G06F 21/78 726/4 |
| 2005/0232285 | A1 * | 10/2005 | Terrell ................ H04L 67/1097 370/401 |
| 2013/0212227 | A1 | 8/2013 | Thomas |

* cited by examiner

*Primary Examiner* — Michael Alsip
(74) *Attorney, Agent, or Firm* — Innovation Counsel LLP (57) ABSTRACT

According to one embodiment, a method includes: assigning a target port to a control path thread of an application to access data stored in a storage device of a data storage system; creating a storage device path corresponding to the target port; running the data path thread to access the data stored in the storage device; and running a control path thread to process a management work request to operate on one of objects including the target port, the storage device path, and the storage device. The control path thread is configured to send the management work request to the data path thread asynchronously. The data path thread is configured to complete the management work request and send a management work request completion response to the control path thread asynchronously.

17 Claims, 4 Drawing Sheets

SYSTEM AND METHOD FOR PROVIDING A ZERO CONTENTION PARALLEL DATA STACK

CROSS-REFERENCE TO RELATED APPLICATION(S)

This application claims the benefits of and priority to U.S. Provisional Patent Application Ser. No. 62/322,127 filed Apr. 13, 2016, the disclosure of which is incorporated herein by reference in its entirety.

TECHNICAL FIELD

The present disclosure relates generally to a data storage system, more particularly, to a system and method for providing a parallel data stack that eliminates contention among data path threads.

BACKGROUND

A data storage system provides a pool of persistent data storage spaces for different clients. In the context of small computer system interface (SCSI), a client that sends input/output (I/O) requests is referred to as an initiator, and a data storage device that stores data is referred to as a target. Initiator and target are applicable not only to the traditional parallel SCSI, but also to Fibre Channel Protocol (FCP), Internet SCSI (iSCSI), HyperSCSI, Advanced Technology Attachment (ATA), Serial ATA (SATA), ATA over Ethernet (AoE), InfiniBand, and any other storage networking protocols.

A target can serve as many I/O requests as possible to one or more initiators. A set of software modules of the data storage system that processes I/O flows from an initiator to a target is referred to as an I/O stack. An I/O stack can include two main components: a data path that provides I/O processing to and from data objects; and a control path that manages the data objects required for the I/O processing in the data path. Examples of the control path management include, but are not limited to, addition, deletion, and modification of data objects.

In an I/O stack of a data storage system, control operations in the control path can modify the state or content of data objects that are used by the data path. This may cause contention and introduce synchronization primitives that can degrade the I/O performance and affect scalability of the data storage system. Typically, synchronization primitives between a control path and a data path are used to ensure that the data objects that are being used in the data path are not modified by the control path. The use of synchronization primitives requires that a data path process that executes I/O workloads has to acquire synchronization primitives, thus adding an overhead to the I/O processing and increasing the likelihood of contention. The synchronization primitives are required on the data objects themselves and also on a global list of data objects. As the scope of the synchronization primitives increases, the likelihood of contention among different data path threads running in the data path increases as well.

Interactions between a control path and a data path include an addition, a deletion, and modification of an object in the data storage. The data path is typically faster than the control path. The control path typically interacts with the same data objects that the data path has to access. Therefore, the control path and the data path may contend for the same data objects. The accesses of the data objects by the control path and the data path are typically protected by a synchronization mechanism. However, the synchronization mechanism may add a delay, including contention and longer code paths, resulting in degraded performance and parallelism.

In a conventional storage target implementation, data objects such as logical unit numbers (LUNs), connections, and access control lists (ACLs) are managed by a control path. The data object management by the control path includes addition of new objects, deletion or modification of existing data objects. These data objects are typically maintained using data structures such as lists, trees, or arrays. Although these storage management objects are owned and managed by the control path, a data path still has to reference these objects. In such a situation, a control path and a data path have to synchronize with each other by acquiring necessary locks.

SUMMARY

According to one embodiment, a method includes: assigning a target port to a control path thread of an application to access data stored in a storage device of a data storage system; creating a storage device path corresponding to the target port; running the data path thread to access the data stored in the storage device; and running a control path thread to process a management work request to operate on one of objects including the target port, the storage device path, and the storage device. The control path thread is configured to send the management work request to the data path thread asynchronously. The data path thread is configured to complete the management work request and send a management work request completion response to the control path thread asynchronously.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

The figures are not necessarily drawn to scale and elements of similar structures or functions are generally represented by like reference numerals for illustrative purposes throughout the figures. The figures are only intended to facilitate the description of the various embodiments

DETAILED DESCRIPTION

Each of the features and teachings disclosed herein can be utilized separately or in conjunction with other features and teachings to provide a parallel data stack that eliminates contention among data path threads. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure describes a system and method for providing a parallel data stack that eliminates contention among a plurality of data paths. The present parallel data stack may also be referred to as a zero contention parallel data stack in some embodiments. The present parallel data stack allows more than one data paths to access shared data structures in a lockless manner simultaneously without resulting in inconsistency. In addition, the present parallel data stack eliminates a need for synchronization primitives between a control path and a data path.

According to one embodiment, the present system and method provides a lockless threading model where a control path runs on its own thread (i.e., a control path thread), and a data path has a plurality of data path threads that run separately. Each thread can run independently from one another without requiring any synchronization primitives between control path threads and data path threads. The present lockless threading model requires no dependency between control path operations and data path operations and no interlocking among data path process operations at both a transport layer and at a LUN layer. The present lockless threading model provides lock-free data structures and synchronization-free data paths. The present lockless threading model removes contention between a control path and a data path, thus eliminating a need for synchronization primitives between the control path and the data path.

Since data path threads run independently from one another and from a control path threads, each data path can scale linearly with an addition of computing resources such as central processing units (CPUs), thus a data storage system can expect improved I/O performance by adding more computing resources when necessary. Since control path operations do not interfere with data path operations that are in progress, consistent performance can be obtained even when changes are made to a control path. A specific data path thread owns a data object and other data path threads are allowed to access the data object without being given the privilege to modify or delete. This way, the present lockless threading model can eliminate timing related race conditions.

Figure 1:
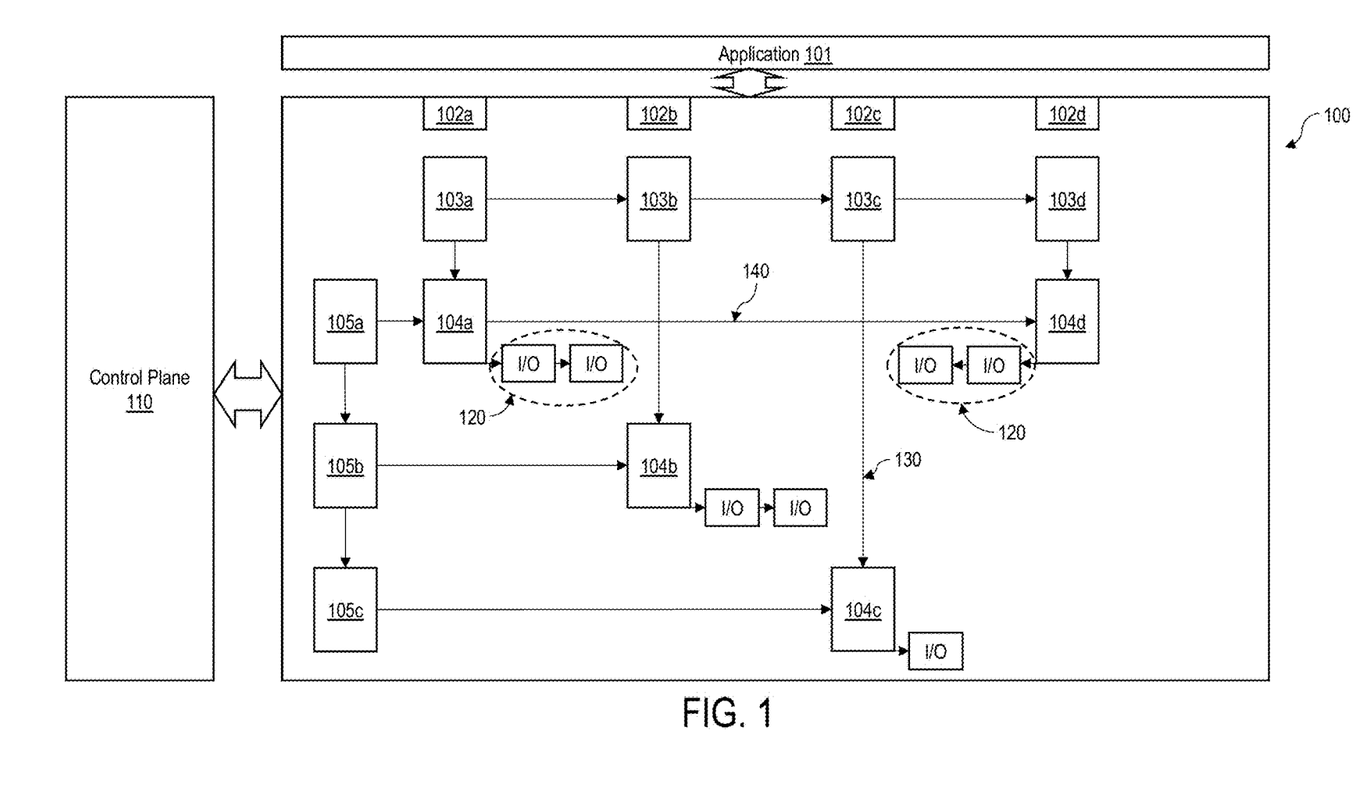
FIG. 1 illustrates an input/output (I/O) stack model of an example data storage system, according to one embodiment.

FIG. 1 illustrates an input/output (I/O) stack model of an example data storage system, according to one embodiment. The I/O stack model 100 includes a plurality of transport end points 102a-102d configured to provide an interface with an application 101 running on an initiator. The application 101 can issue I/O requests to storage units 105a-105c via transport end points 102a-102d, target ports (TPs) 103a-103d, and storage device paths 104a-104d. The operation of the storage units 105a-105c may also be controlled via the control plane 110. The transport end points 102a-102d, individually or collectively, may be referred to as a transport end point 102. Similarly, the target ports 103a-103d, the storage device paths 104a-104d, and the storage units 105a-105c may be individually or collectively referred to as a target port 103, a storage device path 104, and a storage unit 105. In FIG. 1, four transport end points 102a-102d and three storage units 105a-105c are shown. However, the present example shown in FIG. 1 is for illustrative purposes only, and it is understood that any number of the transport end points 102 and the storage units 105 may be used without deviating from the scope of the present disclosure.

Herein, the storage units 105 may be generally referred to as storage devices depending on the type of the data storage system and the protocol that is employed to handle data and control interfaces in accordance with the I/O stack model 100. For example, according to the SCSI protocol, the storage unit 105 may refer to a logical unit number (LUN) representing an individually addressable (logical) SCSI device that is part of a physical SCSI device (target). In another example, the storage units 105 may represent a numbered disk drive in an iSCSI environment. In enterprise deployments, the storage device 105 may represent a subset of RAID disk arrays that is often allocated one per client.

A target port 103 represents a data object of the present I/O stack model 100 that corresponds to a respective transport end point 102. Each target port 103 is connected to a respective storage device path 104 via a target port path 130. According to an access control list (ACL), the storage device path 104 can expose a storage device 105 to a target port 103 and provide a data path to the exposed storage device 105. In the present example, both the storage device path 104a established for the target port 103a and the storage device path 104d established for the target port 103d can form a linked storage device path 140 to expose the storage device 105a. Similarly, the storage device path 104b can expose and provide a data path interface to the storage device 105b, and the storage device path 104c can expose and provide a data path interface to the storage device 105c. In one embodiment, a single storage device path 104 can expose and provide a data path interface to only one storage device 105. Each of the storage device path 104 can have a list of I/O queues 120 on the exposed storage device 105 forming a data path.

The present data storage system employs the I/O stack model 100 for processing and managing I/O queues issued from the application 101. Examples of such I/O queues include, but are not limited to, a data path thread work queue, a target port (TP) work queue, and a data path work queue. Examples of the data path thread work queue include, but are not limited to, a data path create command. Examples of the TP work queue include, but are not limited to, an initiator create command and an initiator delete command. Examples of the data path work queue include, but are not limited to, a storage device path create command, a storage device path delete command, a storage device map command, a storage device unmap command, a notification to an initiator of a storage device map operation, a LUN resize command, a storage device delete command, and a capacity notification (e.g., a notification that a thin provisioned threshold has reached).

The application 101 running on an initiator negotiates with a target storage unit 105 via the target port 103 and the storage device path 104, and establishes a connection to the target storage unit 105 after successful negotiation with the target storage unit 105. The application 101 may treat the target storage device 105 the same way as they would a raw storage device (e.g., a SCSI device and an IDE hard drive). For example, rather than mounting remote directories as would be done in NFS or CIFS environments, iSCSI systems may format and directly manage filesystems on the storage devices 105a-105c.

The control plane 110 can provide various operational commands to the I/O stack model 100. For example, the control plane 110 can add or delete target ports 103, enable or disable an established target port 103, add or delete storage units 105, and add or delete an access control list (ACL). The ACL allows the storage unit 105 to be exported to the initiator via the target port 103. These operational commands for adding/deleting target ports 103, storage units 105, and ACLs and enabling/disabling a target port 103 can cause the corresponding storage device path 104 to be deleted or created.

Typically, an I/O path object (e.g., the storage device path 104) faces several synchronization points during delete operations. Synchronization points may impede linear scaling of I/O throughput on the I/O stack. For example, the storage device paths 104 and the storage device 105 may require synchronization with other data objects and the target port 103 and the access control list ACL using locks to protect themselves from deletion. Addition of a new storage device path 104 to the storage device path list and a storage device 105 to the storage device list may traverse in a data path through several I/O path objects requiring synchronization points for each of the traversing I/O path objects. Further, nature of contention exists between the control plane and the data plane may lead to indirect contention among multiple data threads in the data path plane if locks on a shared list are acquired. In addition, synchronization between the control plane and the data plane required for completion of the I/O operations hampers concurrent handling of multiple control path operations.

The present I/O stack model 100 manages data objects that abstract physical storages (e.g., the target ports 103 and the storage devices 105) and storage access points (e.g., the transport end points 103). The control path is responsible for creating and deleting I/O path objects, and the I/O path deals with a subset of the objects including the storage devices 105, the storage device paths 104, and the list of I/O queues 120.

The zero contention that the present I/O stack model 100 provides enables linear scaling of I/O throughput on the I/O stack. The I/O throughput of the data storage system can be linearly increased by adding more data storage devices to the data storage system or by increasing the number of data path threads. According to one embodiment, the present I/O stack model 100 uses threads in the control plane and the data plane to increase parallelism. According to one embodiment, the present I/O stack model 100 can provide zero contention by allowing deletion of an I/O path object without synchronization, thereby eliminating a need to acquire locks to protect data objects being referenced while the I/O path object is being deleted. According to the present I/O stack model 100, the interaction between control plane threads and data plane threads does not require synchronization such that the present I/O stack model 100 can handle multiple concurrent management operations and eliminate a need to acquire locks and other synchronization mechanisms in the I/O path.

Figure 2:
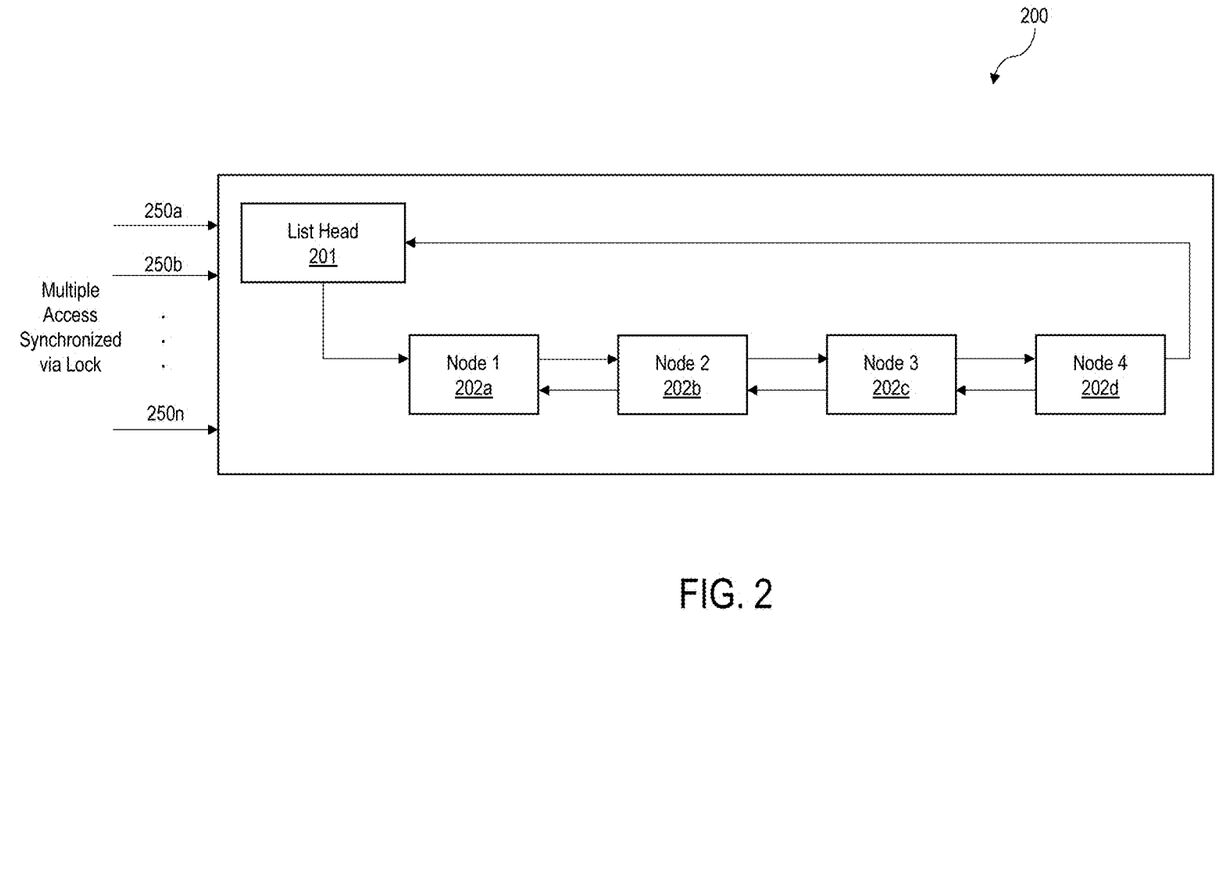
FIG. 2 illustrates a block diagram of an example list of objects, according to one embodiment.

FIG. 2 illustrates a block diagram of an example list of objects, according to one embodiment. The list of objects 200 manages and handles work requests 250 for managing operations (e.g., add/delete/modify operations) of storage devices. In one embodiment, the list of objects 200 is a spinlock list and is protected by a spinlock. A spinlock is a lock that can be held by at most one thread. If a thread attempts to acquire a spinlock while it is contended, the thread spins waiting for the lock to become available. If the lock is not contended, the thread can immediately acquire the lock and continue. The spinning prevents more than one thread from access the data at any one time.

According to one embodiment, the list of objects 200 is a doubly linked circular list. The list of objects 200 processes multiple access requests 250a-250n that are synchronized via locks. The locks may be used to safely delete objects (e.g., the target ports 103, the storage device paths 104, and the storage devices 105). The list of objects 200 includes a plurality of nodes, namely, nodes 1 (202a) to node 4 (202d), and a list head 201 represents a header of the list of objects 200. When adding a new node or deleting an existing node 202, the locks are used to protect data objects that are referenced.

Referring to FIG. 1, an I/O queue is processed in the following order. The I/O queue may be stored in a buffer as the list 120 corresponding to each storage device 105. The storage device path 104 is looked up on which the I/O queue is issued, and the storage device 105 is looked up from the storage device path 104. The I/O queue is queued in the list 120 and processed on the storage device 105. According to one embodiment, the present I/O stack model 100 employs a global object list to serve as a root of the data model. The global object list can store information regarding objects and threads, and their relationship.

Figure 3:
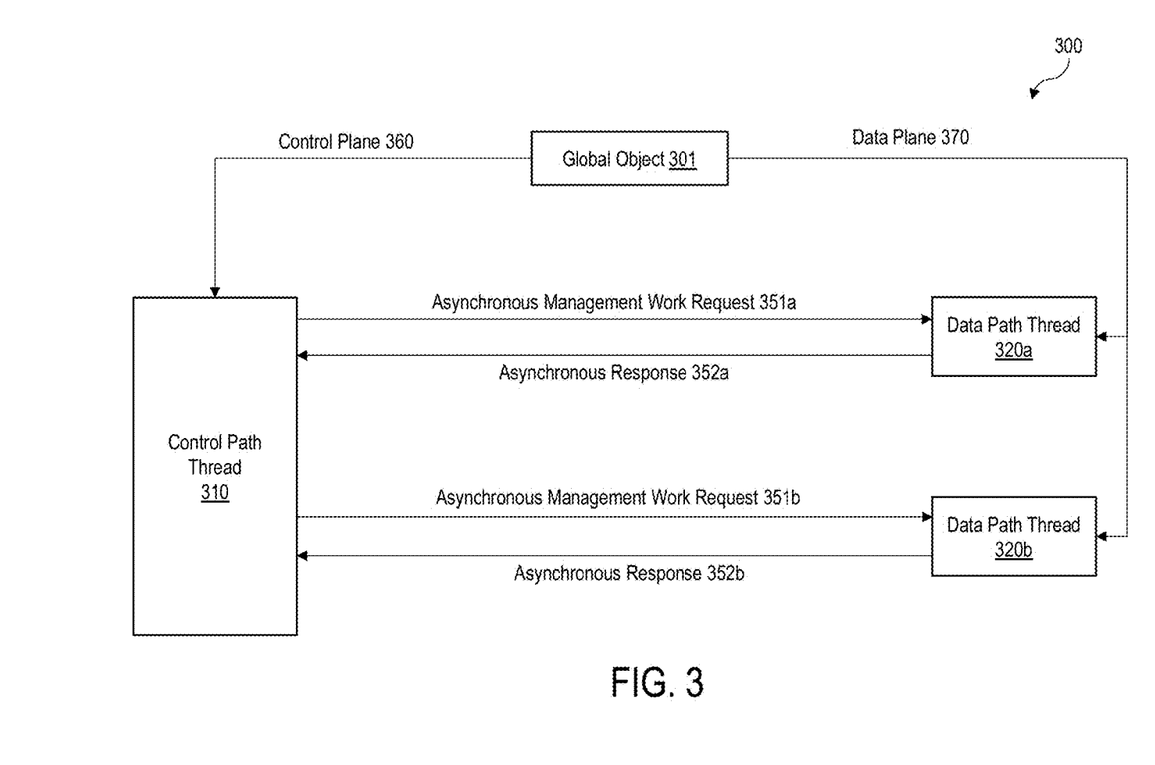
FIG. 3 illustrates a process for inter-process communication between control path threads and data path threads, according to one embodiment.

FIG. 3 illustrates a process for inter-process communication between control path threads and data path threads, according to one embodiment. The data stack 300 enables parallel creation, deletion, and management of various objects using a global object list 301 and asynchronous communication between control path threads 310 and data path threads 320. On the control plane 360, one or more control path threads 310 may be running. Similarly, on the data plane 370, one or more data path threads 320 may be running. In the present example shown in FIG. 3, only one control path thread 310 and two data path threads 320a and 320b are shown. However, the present example is for illustrative purposes only, and it is understood that any number of control path threads 310 and data path threads 320 may be used without deviating from the scope of the present disclosure.

The global object list 301 maintains a global state of the storage devices that store data of the data storage system. The global object 301 list provides a global look up of a control path thread list, a list of control threads 310, a list of storage devices 105, a list of target ports 102, various lookup tables, etc. The global object 301 provides information for the global state of the data storage system in which targets that store data may be physically and logically distributed among multiple individually addressable storage devices 105.

The control path thread 310 can create a management work request 351 and posts the management work request 351 to the data path thread 320 via inter-process communication (IPC). The IPC allows multiple processes (or threads) of an operating system to share data. The data path thread 320 is responsible for completing the management work request 351 and posting a response 352 back to the control path thread 310. The management work request 351 and the response 352 may be sent from or received by the control path thread 310 and the data path thread 320 asynchronously.

The data stack 300 provides a division of object ownership and management by the control plane 360 and the data plane 370. For example, the control path thread 310 owns and manages transport-related objects such as the target ports 103 shown in FIG. 1. The data path thread 320 owns I/O-related objects such as the storage devices 105 and the storage device path 104 shown in FIG. 1, however the control path thread 310 is still responsible for managing the storage devices 105 and the storage device path 104. Examples of the management operations include, but are not limited to, addition/deletion of a new storage device path to a storage device, and addition/deletion of a storage device. The division of the ownership and management by the control plane and the data plane eliminates synchronization points that are otherwise required when adding, deleting, and/or modifying objects of a data stack. When a thread owns an object, the thread is authorized to operate on the object including add/delete/modify operations. For add/modify operations, the control path thread 310 posts management work requests 351 to the data path thread 320. For delete operations, the control plane 360 employs a delete-safe list for safe deletion of the objects of the data stack including the transport related objects (e.g., the target ports 103) and/or I/O related objects (e.g., the storage devices 105 and the storage device path 104).

According to one embodiment, the control plane 360 can receive the management work request 351 for adding a new storage device 105. The control path thread 310 allocates one or more data objects and initializes them based on the request data. The control path thread 310 selects a least-loaded data path thread 320 to be the owner of the newly created storage device 105. The control path thread 310 then creates a management work request 351 to the data path thread 320 with the request to add the storage device 105 to its list of managed objects. The data path thread 320 processes the management work request 351 by adding the storage device 105 to its list of managed objects and sends a response 352 back to the control path thread 310. The control path thread 310 receives the response 352 from the data path thread 320, updates the global object list 301 accordingly, and completes the management request (i.e., adding the new storage device 105).

According to one embodiment, the control plane 360 can receive the management work request 351 for deleting an existing storage device 105. The control path thread 320 removes the storage device 105 from a storage device lookup table of the global object list 301 for preventing further management operations from being issued to the storage device 105. The control path thread 320 places the storage device path 104 corresponding to the storage device 105 to be deleted on a delete list for delayed garbage collection. The control path thread 310 then creates a management work request 351 to delete the storage device 105 and sends the management work request 351 to the data path thread 320. The data path thread 320 processes the management work request 351 in the following sequence. First, the data path thread 320 drains all I/Os issued to the storage device 105 and prevents further I/O activities. Next, the data path thread 320 removes the storage device 105 from its locally managed objects, and sends a response 352 back to the control path thread 310. The control path thread 310 receives the response 352 and completes the management operation (i.e., deleting the storage device 105) by deallocating the storage device 105 and removing the storage device path 104 from the delete list and freeing it after a delete safe timer expires. Detailed steps of removing the storage device path 104 from the delete list and freeing the storage device path 104 will be explained in further detail below.

According to one embodiment, the control plane 360 can receive the management work request 351 for creating a new access control list (ACL) for a storage device 105. An ACL is a request to expose a storage device 105 to a specific initiator via a target port 103. The control path thread 310 allocates an object for the storage device path 104 and inserts it into a list of storage device paths 104 that belongs to the requested target point 103. The control path thread 310 then sends a management work request 351 to the data path thread 320 that owns the storage device 105 to add the storage device path 104 to a list of storage device paths 104 owned by the data path thread 320. The data path thread 320 receives the management work request 351, adds the storage device path 104 to the list of storage device paths of the storage device 105, and sends a response 352 back to the control path thread 310. The control path thread 310 receives the response 352 and completes the management operation (i.e., creating the ACL).

According to one embodiment, the control plane 360 can receive the management work request 351 for deleting a storage device path 104. The process for deleting the storage device path 104 can be driven by two separate events. First, a target port 103 goes offline, and the management request revokes an ACL of the storage device path 104. The ACL identifies the storage device 105 to which the storage device path 104 provides an access. The control path thread 310 removes the storage device path 104 from the list of storage devices paths 104 of the target port 103 and removes the storage device path 104 from the list of storage devices paths 104 of the storage device 105 via a delete list. The control path thread 310 completes the management operation (i.e., deleting the storage device path 104) by adding the data object of the storage device path 104 to the delete list for delayed garbage collection.

The present delete-safe list allows a data path to continue to access data objects without having to protect against delete operations coming from the control plane 360. The control plane 360 is able to perform the required garbage collection for deletion without having to synchronize with the data plane 370. The implication of the delete-safe list ensures that a data path thread 320 that is walking through a list of managed objects is always guaranteed to a sane list. In addition, the delete-safe list ensures that the data path thread 320 that is currently referencing the object is always guaranteed that the object being referenced is not deleted by the control plane 360.

Unlike traditional list of objects, the present delete-safe list has the following characteristics. First, the present delete-safe list provides a list of lookup nodes that is independent of data objects. According to one embodiment, a lookup node includes, but not limited to, lookup list information, delete list information, a delete timestamp, and an object pointer. The lookup list information is used by the data path threads 320 to traverse the list of objects. The delete list information is only valid when the object has been deleted. The control path thread 310 uses the delete list information to maintain a list of deleted objects. The deletion timestamp is used when a delete operation occurs. The deletion timestamp is used by the control path thread 310 to perform delayed garbage collection of the deleted object. The object pointer is used to point to an actual data object. The object pointer may be used by the data path thread 320 to reference a data object or by the control path thread 310 to free up resources after a delete safe timer associated with the data object expires. After the deletion of the object, the lookup list is modified to allow the data path thread 320 to have continued access to a sane list of objects. The control path thread 310 is guaranteed to be able to release the resources for the object after the delete-safe timer expires.

According to one embodiment, an object reference count is used when freeing up the resources for a deleted object. For example, the data path thread 320 holds the object reference count on the object while working on the object. In some cases, the object may not be in a stated to be still referenced even after the delete-safe timer expires. The control path thread 310 checks whether or not the object reference count is reached zero after the delete-safe timer expires to guarantee that the resources of the object can be safely released. The object reference count enables contention-free deletion of an object because the data path thread 320 modifies the counter while the control path thread 310 can only read the counter after the delete-safe timer for the object in the delete list has expired.

Figure 4A:
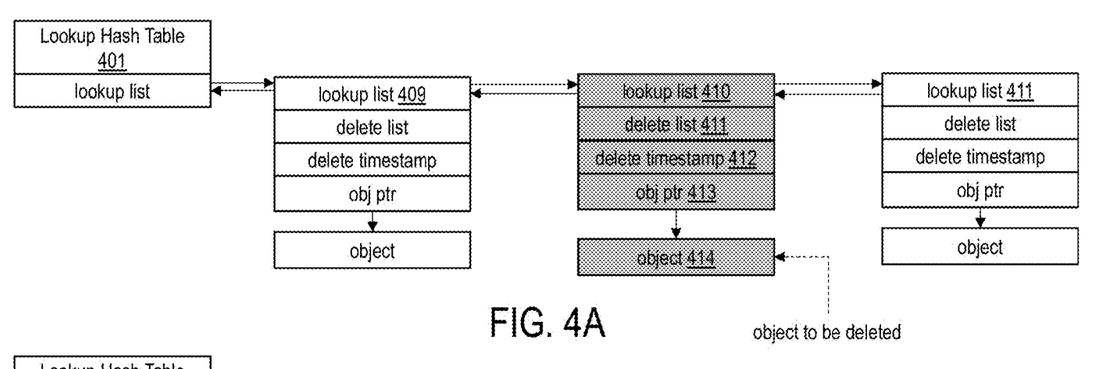
FIGS. 4A and 4B illustrate a safe deletion process for deleting a data object, according to one embodiment.
Figure 4B:
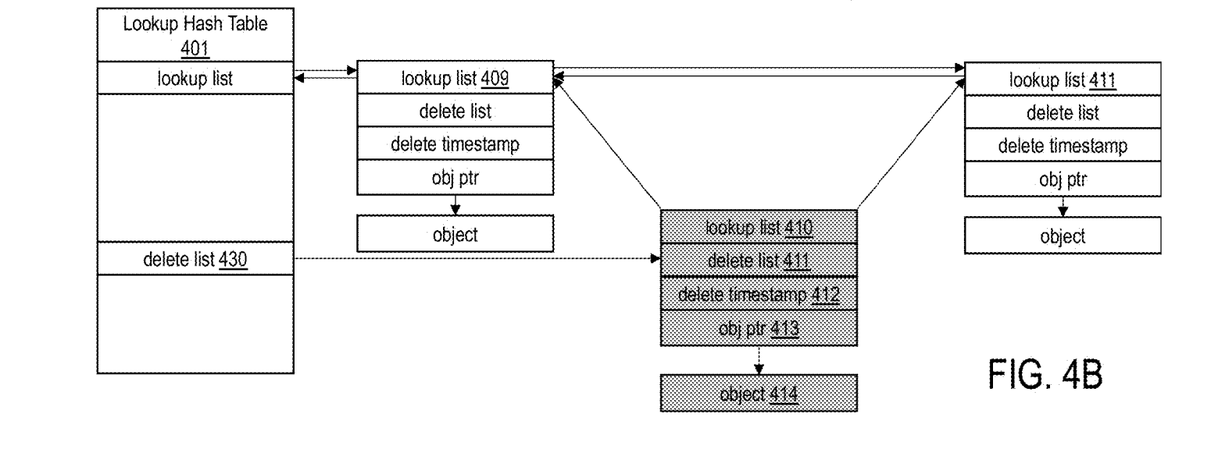

FIGS. 4A and 4B illustrate a safe deletion process for deleting a data object, according to one embodiment. A lookup hash table 401 includes a plurality of lookup nodes that are linked by a linked list. The linked list of storage device paths for a particular storage device (e.g., the storage device 105a of FIG. 1) ensures that the data path thread does not have to synchronize with the control path while referencing the storage device path as part of I/O processing. In the present example, the linked list includes lookup lists 409, 410, and 411 that are linked by a doubly linked list. Each of the lookup lists includes a delete list, a delete timestamp, an object pointer that points to an object. For example, the lookup list 410 includes a delete list 411, a delete timestamp 412, and an object pointer 413 that points to an object 414 (e.g., storage device paths 104 and storage devices 105 shown in FIG. 1). The delete list 411 is used to update the delete list of the lookup hash table 401. The delete timestamp 412 is used to set a time for safe deletion of the object 414. In one embodiment, after the lookup list 410 is removed from the linked list, the delete timestamp 412 starts to run to indicate a safe time to permanently delete the object 414.

Referring to FIG. 4A, a safe deletion process operates in the context of a control path thread, for example, the control path thread 310 of FIG. 3. Among the lookup lists referenced by the lookup hash table 401, the control path thread determines to delete an object 411 associated with the lookup list 410. At the management work request by the control path thread to delete the object 414, the lookup list 410 is first unlinked from the linked list.

Referring to FIG. 4B, the links of the lookup list 410 to and from the previous and next lookup lists 409 and 411 are broken, and the lookup lists 409 and 411 are directly linked. However, the lookup list 410 can still reference to the lookup lists 409 and 411 while it is marked as a deleted lookup list until safe deletion after the expiry by the delete timestamp 412. The lookup hash table 401 updates its deleted list 430 to add the delete list 411 of the lookup list 410. New management work requests issued to the lookup list 410 may not reach to the lookup list 410 after being listed in the delete list 430 of the lookup hash table 401. The deleted lookup list 410 may be still available for a lookup by data path threads until a safe deletion timer expires. This allows for the hash lookup table 401 to be modified by the control path thread while still permitting data threads to continue to access the lookup list 410 via the hash lookup table 401. After the safe deletion time expires, the deleted object 414 is released by garbage collection as explained above with reference to FIG. 3. The object 414 and its associated objects may be permanently deleted after the delete-safe timer indicated by the delete timestamp 312 expires. In some embodiments, the lookup list 410 may include an object reference counter to indicate a safe deletion of the object 424 in cases when the object 424 is still referenced by data path threads after the expiry of the delete-safe timer. In one embodiment, the object reference counter may indicate the number of data path threads that access the deleted object 414. In another embodiment, the object reference counter may indicate the number of I/O queues issued to a data storage device.

According to one embodiment, a method includes: assigning a target port to a control path thread of an application to access data stored in a storage device of a data storage system; creating a storage device path corresponding to the target port; running the data path thread to access the data stored in the storage device; and running a control path thread to process a management work request to operate on one of objects including the target port, the storage device path, and the storage device. The control path thread is configured to send the management work request to the data path thread asynchronously. The data path thread is configured to complete the management work request and send a management work request completion response to the control path thread asynchronously.

The management work request may include an operation to add or delete the objects.

The storage device path may include a lockless queue including a linked list of I/O queues to access the data stored in the storage device.

The control path threads may be configured to identify the data path thread to send the management work request based on a global object list.

The control path thread may own and manage the target port.

The data path thread may own the storage device and the storage device path.

The control path thread may manage the storage device and the storage device path.

The global object list may include a global look up of a control path thread list, a list of control threads, a list of storage devices, a list of target ports.

The management work request may be a request to add a new storage device. The method may further include: selecting a least-loaded data path thread among a plurality of data path threads; creating and sending, from the control path thread, a second management work request to the least-loaded data path thread to assign an ownership of the new storage device to the least-loaded data path; updating, by the least-loaded data path, a list of managed objects owned by the least-loaded data path thread by adding the new storage device; and updating, by the control path thread, the global object list to update the ownership of the new storage device.

The management work request may be a request to delete the storage device. The method may further include: removing the storage device from a storage device lookup table in the global object list; listing the storage device in a delete list in the global object list; creating and sending, from the control path thread, a second management work request to the data path thread that owns the storage device path to delete the storage device; and deleting the storage device after a predetermined timer expires.

The method may further include: performing uncompleted I/O queues issued to the storage device; removing, by the control path thread, the storage device from a list of managed objects owned by the control path thread; and deleting the storage device and removing the storage device from the delete list in the global object list after a predetermined timer expires.

The method may further include: allowing the data path thread to perform the uncompleted I/O queues issued to the storage device until the predetermined timer expires.

The method may further include: providing an object reference count associated with the storage device; checking the object reference count after the predetermined timer expires; determining to delete the storage device when the object reference count reaches zero allowing a safe deletion of the storage device.

The management work request may be a request to create an access control list (ACL) for the storage device. The method may further include: receiving the request via the target port; creating, by the control path thread, a new storage device path to expose the storage device to the data path thread; linking the new storage device path to the target port; creating and sending, from the control path thread, a second management work request to the new storage device path; updating, by the new storage device path, a list of managed objects owned by the new storage device path by adding the storage device; and updating, by the control path thread, the global object list to update the ownership of the storage device.

The management work request may be a request to delete the storage device path. The method may further include: listing the storage device path in a delete list in the global object list; performing uncompleted I/O queues issued to the storage device; removing the storage device path from a list of managed object owned by the target port; removing the storage device path from a list of storage device paths owned by the storage device; and deleting the storage device path after a predetermined timer expires.

The method may further include: allowing the data path thread to perform the uncompleted I/O queues issued to the storage device until the predetermined timer expires.

The method may further include: providing an object reference count associated with the storage device path; checking the object reference count after the predetermined timer expires; and determining to delete the storage device path when the object reference count reaches zero allowing a safe deletion of the storage device path.

The above example embodiments have been described hereinabove to illustrate various embodiments of implementing a system and method for providing a parallel data stack that eliminates contention among data path threads. Various modifications and departures from the disclosed example embodiments will occur to those having ordinary skill in the art. The subject matter that is intended to be within the scope of the invention is set forth in the following claims.

What is claimed is:

1. A method comprising:
   assigning a target port to a control path thread of an application to access data stored in a storage device of a data storage system;
   creating a storage device path corresponding to the target port;
   running a data path thread to access the data stored in the storage device; and
   running the control path thread to process a management work request to operate on one of data objects including a first data object corresponding to the target port, a second data object corresponding to the storage device path, and a third data object corresponding to the storage device,
   wherein the control path thread is configured to send the management work request to the data path thread asynchronously, and wherein the data path thread is configured to complete the management work request and send a management work request completion response to the control path thread asynchronously.

2. The method of claim 1, wherein the management work request includes an operation to add or delete the data objects.

3. The method of claim 1, wherein the storage device path includes a lockless queue comprising a linked list of I/O queues to access the data stored in the storage device.

4. The method of claim 3, wherein the control path threads is configured to identify the data path thread to send the management work request based on a global object list.

5. The method of claim 1, wherein the control path thread owns and manages the target port.

6. The method of claim 1, wherein the data path thread owns the storage device and the storage device path.

7. The method of claim 1, wherein the control path thread manages the storage device and the storage device path.

8. The method of claim 4, wherein the global object list includes a list for a global look up of the control path thread, a list of control threads, a list of storage devices, a list of target ports.

9. The method of claim 8, wherein the management work request is a request to add a new storage device, the method further comprising:
selecting a least-loaded data path thread among a plurality of data path threads;
creating and sending, from the control path thread, a second management work request to the least-loaded data path thread to assign an ownership of the new storage device to the least-loaded data path;
updating, by the least-loaded data path, a list of managed data objects owned by the least-loaded data path thread by adding the new storage device; and
updating, by the control path thread, the global object list to update the ownership of the new storage device.

10. The method of claim 8, wherein the management work request is a request to delete the storage device, the method further comprising:
removing the storage device from a storage device lookup table in the global object list;
listing the storage device in a delete list in the global object list;
creating and sending, from the control path thread, a second management work request to the data path thread that owns the storage device path to delete the storage device; and
deleting the storage device after a predetermined timer expires.

11. The method of claim 10, further comprising:
performing uncompleted I/O queues issued to the storage device;
removing, by the control path thread, the storage device from a list of managed data objects owned by the control path thread; and
deleting the storage device and removing the storage device from the delete list in the global object list after a predetermined timer expires.

12. The method of claim 11, further comprising: allowing the data path thread to perform the uncompleted I/O queues issued to the storage device until the predetermined timer expires.

13. The method of claim 12, further comprising:
providing an object reference count associated with the storage device;
checking the object reference count after the predetermined timer expires;
determining to delete the storage device when the object reference count reaches zero allowing a safe deletion of the storage device.

14. The method of claim 8, wherein the management work request is a request to create an access control list (ACL) for the storage device, the method further comprising:
receiving the request via the target port;
creating, by the control path thread, a new storage device path to expose the storage device to the data path thread;
linking the new storage device path to the target port;
creating and sending, from the control path thread, a second management work request to the new storage device path;
updating, by the new storage device path, a list of managed data objects owned by the new storage device path by adding the storage device; and
updating, by the control path thread, the global object list to update the ownership of the storage device.

15. The method of claim 8, wherein the management work request is a request to delete the storage device path, the method further comprising:
listing the storage device path in a delete list in the global object list;
performing uncompleted I/O queues issued to the storage device;
removing the storage device path from a list of managed data objects owned by the target port;
removing the storage device path from a list of storage device paths owned by the storage device; and
deleting the storage device path after a predetermined timer expires.

16. The method of claim 15, further comprising: allowing the data path thread to perform the uncompleted I/O queues issued to the storage device until the predetermined timer expires.

17. The method of claim 16, further comprising:
providing an object reference count associated with the storage device path;
checking the object reference count after the predetermined timer expires; and
determining to delete the storage device path when the object reference count reaches zero allowing a safe deletion of the storage device path.

* * * * *